3,389,413
SINGLE SPINDLE TAP UNIT
Johannes L. van den Kieboom, Mount Clemens, Mich., assignor to La Salle Machine Tool, Inc., Warren, Mich., a corporation of Michigan
Filed July 11, 1966, Ser. No. 564,261
6 Claims. (Cl. 10—139)

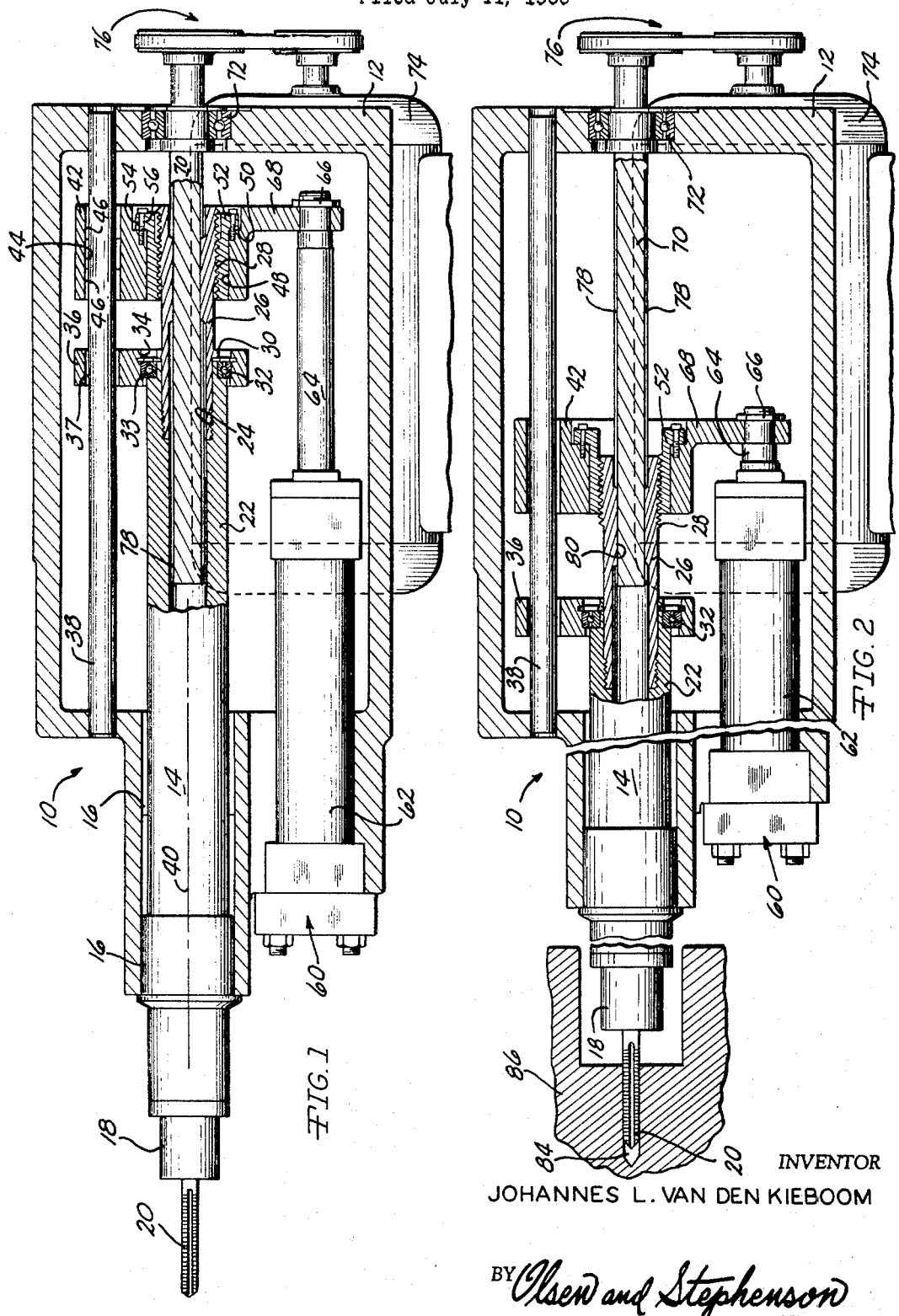
June 25, 1968    J. L. VAN DEN KIEBOOM    3,389,413
SINGLE SPINDLE TAP UNIT
Filed July 11, 1966
INVENTOR
JOHANNES L. VAN DEN KIEBOOM
BY Olsen and Stephenson
ATTORNEYS

This invention relates generally to machine tool tap units and more particularly to an improved single spindle tap unit.

Many automated machine tool assemblies include tap units for threading workpiece holes. Each unit must be capable of rapid advance to bring the tapping tool up to the hole to be tapped, and rapid return, following tapping, to move the tool out of the path of the workpiece and the workpiece transfer apparatus during indexing of the workpieces to move them to the various work stations in the machine tool assembly. Heretofore, the spindle on which the tool is mounted has been rotatably supported in a quill which has in turn been supported in a second spindle. During rapid advance and return of the tool it has been necessary to move the second spindle, the quill, the drive shaft and all of the other structure associated therewith. This has necessitated not only a heavy and space consuming tap unit, both of which characteristics are objectionable in an automated machine tool assembly for obvious reasons, but also has required high capacity equipment for rapidly advancing and returning the unit. It is an object of this invention, therefore, to provide an improved tap unit which is simpler and less expensive than the units heretofore used, involves movement of only a single spindle during rapid advance and return, and is of a compact readily serviceable and adjustable construction.

Further objects, features and advantages of this invention will become apparent from a consideration of the following description, the appended claims, and the accompanying drawing in which:

FIGURE 1 is a longitudinal sectional view of the single spindle tap unit of this invention, showing the unit in a return position; and FIGURE 2 is a foreshortened longitudinal sectional view of the single spindle tap unit of this invention, illustrated similarly to FIG. 1, showing the unit in an advanced and tapping position in which the tapping tool extends into a workpiece opening.

With reference to the drawing, the single spindle tap unit of this invention, indicated generally at 10, is illustrated in FIG. 1 as including a support housing 12 in which a hollow spindle 14 is rotatably mounted on a pair of sleeve bearings 16 which are spaced apart in a direction axially of the spindle 14. An adaptor 18 on the outer or working end of spindle 14 has a tapping tool 20 removably mounted therein. The spindle 14 has an inner end portion 22 positioned in the housing 12 and provided with an internally threaded axial opening 24. A hollow screw 26 is threaded at one end into the spindle opening 24 and is provided at its opposite end with external threads 28 having a lead corresponding to the lead on the tapping tool 20. Intermediate its ends, the hollow screw 26 is provided with an annular shoulder 30 which abuts a ball bearing unit 32 mounted on the inner end portion 22 of the spindle 14 so that the unit 32 abuts a shoulder 33 on the spindle 14.

The ball bearing unit 32 is mounted in an opening 34 in a hanger plate 36 that carries a sleeve bearing 37 slidably mounted on a guide bar 38 in the housing 12. The guide bar 38 is positioned so that it is parallel to the axis 40 of the spindle 14. As a result, during movement of the hanger plate 36 along the guide bar 38, the ball bearing unit 32 is maintained in a concentric relation with the spindle 14.

A block member 42 is provided with an opening 44 in which sleeve bearings 46 are mounted. The guide bar 38 extends through the sleeve bearings 46 to provide for a slidable support of the block member 42 on the guide bar 38, so that the block member 42 is also movable in a direction parallel to spindle axis 40. The block member 42 also has an opening 48 therein which is concentric with the spindle axis 40 and is provided with a radially outwardly extending shoulder 50. A nut 52, threaded on the screw threads 28 has a flange 54 which is positioned against the shoulder 50 and is secured to the block member 42 by bolts 56.

It can thus be seen that when the block member 42 is moved along the guide bar 38, it will carry the nut 52 along with it, and the nut 52 will in turn carry the screw 26 which will move the spindle 14, the spindle 14 being supported during this movement on the sleeve bearings 16. The block member 42 is moved along the guide bar 38 by a fluid, either oil or air, actuated cylinder assembly 60 having a cylinder 62 which is fixed on the housing 12 and an extendible and retractable piston rod 64 which is parallel to the axis 40. The end 66 of the piston rod 64 is connected to an arm 68 which is formed integral with the block member 42. As a result, on retraction of the piston rod 64, the block member 42 is moved to the left as viewed in FIG. 1 to thereby move the spindle 14 so as to advance the tapping tool 20 and move it up to the hole to be tapped.

The spindle 14 is rotated by a drive shaft 70 which is supported on a bearing 72 carried by the housing 12 and is illustrated as being driven by a brake motor 74 which drives a belt and pulley assembly 76. The drive shaft 70 has external splines 78 which mesh with internal splines 80 on the screw 26. Consequently, on rotation of the drive shaft 70, the splines 78 and 80 provide for rotation of the screw 26 to in turn provide for rotation of the spindle 14. Since the nut 52 cannot rotate, this rotation of the screw 26 also provides for advance of the tapping tool 20 into the hole to be threaded.

In the operation of the single spindle tap unit 10 of this invention, assume that the parts of the unit 10 are in the positions illustrated in FIG. 1 in which the tool 20 is in a return position relative to the work. Further assume that a hole 84 (FIG. 2) in a workpiece 86 is to be tapped. The cylinder assembly 60 is operated to retract the piston rod 64 (FIG. 2) a predetermined distance to a position in which the tool 20 is advanced up close to the workpiece hole 84. The drive shaft 70 is then rotated in a direction to thread the screw 26 out of the nut 52 in a direction toward the workpiece 86. This causes the tapping tool 20 to be rotated into the hole 84, as shown in FIG. 2, to form threads in the hole 84. As soon as the spindle 14 has advanced the tool 20 to a predetermined distance into the hole 84, the tapping operation is completed, and the direction of rotation of the drive shaft 70 is reversed to thread the screw 26 back into the nut 52 and thread the tool 20 out of the hole 84. When the tool 20 has been moved out of the hole 84, the cylinder assembly 60 is actuated to extend the piston rod 64 and return the block member 42 to its FIG. 1 position in which the tool 20 is positioned sufficiently far to one side of the workpiece 86 and the transfer apparatus therefor (not shown) which moves the workpiece 86 to various work stations, so that the tool 20 will not interfere with transfer of the workpiece 86.

From the above description it is seen that this invention provides a single spindle tap unit 10 which is of a simplified construction is achieved by virtue of the guided support of the spindle 14 and the block member 42 on the guide bar 38 and the direct attachment of the block member 42 to the cylinder assembly 60 which can be operated to rapidly advance the spindle 14 up to the work and return the spindle. The screw 26 and the nut 52 can readily be removed and replaced with similar parts when a tapping tool 20 having a different lead is to be used, and the bearing unit 32 can also easily be removed and replaced when necessary. The screw 26 and the spindle 14 can also be formed as a single part in which case this single part and the nut 52 are replaced when a change to a different tapping tool is made.

It will be understood that the single spindle tap unit which is herein disclosed and described is presented for purposes of explanation and illustration and is not intended to indicate limits of the invention, the scope of which is defined by the following claims.

What is claimed is:

1. A single spindle tap unit comprising a support, a spindle adapted to have a tapping tool attached thereto and rotatably mounted on said support for rotation about an axis, guide means carried by said support and disposed parallel to said axis, nut means guidably mounted on said guide means and arranged in a coaxial relation with said spindle, screw means secured to said spindle and threadably supported in said nut means, a drive shaft for said spindle arranged in a telescoping relation therewith and operable upon rotation to rotate said screw means in said nut means so as to advance said spindle with respect to said nut means, and means mounted on said support and connected to said nut means providing for translatory movement of said nut means on said guide means to move said spindle along said axis.

2. A single spindle tap unit according to claim 1 further including a block member guidably supported on said guide means and having said nut means removably mounted therein, and means connecting said block member to said means for moving the nut means.

3. A single spindle tap unit according to claim 2 in which said means for moving the nut means is a fluid actuated cylinder assembly comprised of a cylinder fixed on said support and a piston rod disposed parallel to said axis.

4. A single spindle tap unit according to claim 1 in which said guide means consists of a rod mounted on said support in a position parallel to said axis, and further including bearing means arranged in a supporting relation with said spindle and guidably supported on said rod.

5. A single spindle tap unit according to claim 1 in which said support is a housing having said spindle positioned therein.

6. A single spindle tap unit according to claim 2 in which said nut means is removably mounted on said block member and said screw means is removably secured to said spindle.

References Cited

UNITED STATES PATENTS 3,178,740  4/1965  Dorak _____ 77—34.4

FRANCIS S. HUSAR, *Primary Examiner.*